United States Patent [19]
Ohata et al.

[11] Patent Number: 5,134,170
[45] Date of Patent: Jul. 28, 1992

[54] ACRYLIC RUBBER COMPOSITION

[75] Inventors: Hiroyuki Ohata; Harukazu Okuda; Satoshi Terasaki, all of Fukui; Masaharu Takahashi, Gunma, all of Japan

[73] Assignees: Nissin Chemical Industry Co. Ltd.; Shin-Etsu Chemical Co., Ltd., both of Japan

[21] Appl. No.: 792,598

[22] Filed: Nov. 15, 1991

[30] Foreign Application Priority Data

Nov. 20, 1990 [JP] Japan .................. 2-314644

[51] Int. Cl.$^5$ .............................. C08J 9/10
[52] U.S. Cl. ........................ 521/82; 521/91; 521/92; 521/96; 521/134; 521/138; 521/149; 521/154; 524/520; 524/521; 525/169; 525/183; 525/199; 525/209
[58] Field of Search ............... 521/149, 154, 134, 82, 521/91, 92, 96, 138

[56]  References Cited

U.S. PATENT DOCUMENTS 4,722,975  2/1988  Itoh et al. ...................... 525/387

Primary Examiner—Morton Foelak
Attorney, Agent, or Firm—Henry T. Burke

[57]  ABSTRACT

An acrylic rubber composition is proposed which is improved in respect of the extrusion-moldability as well as the surface slipperiness of the vulcanized article obtained therefrom. The composition comprises (a) an acrylic rubbery cooplymer which is a copolymer of a (meth)acrylic ester and a coolymerizable organosilicon compound having a silicon-bonded vinyl group in a molecule, (b) a reinforcing filler, (c) a powder of spherical particles having a specified average particle diameter and (d) an organic peroxide as a vulcanizing agent. The composition can be compounded further with a blowing agent to give a foamable rubber composition capable of being vulcanized into a spongy rubber body exhibiting excellent feeling on touch and slipperiness in contact with human skin to be useful, for example, as a material of cosmetic puffs.

2 Claims, No Drawings

ACRYLIC RUBBER COMPOSITION

BACKGROUND OF THE INVENTION

The present invention relates to a rubber composition or, more particularly, to an acrylic rubber composition capable of giving a vulcanized rubber article having excellent heat resistance, weatherability, oil resistance and surface lubricity and a foamable acrylic rubber composition which gives a cellular spongy rubber article having excellent properties.

It is known that, among various types of acrylic rubber compositions, those having vinyl group-containing organosilicon groups in the molecule are widely used as a material of automobile parts and general-purpose industrial articles shaped by the method of compression molding, injection molding and extrusion molding by virtue of their excellent characteristics that the vulcanizates thereof have excellent heat resistance and very low permanent compression set in addition to the advantageous vulcanizability behavior that vulcanization of the composition compounded with an organic peroxide as a vulcanizing agent can proceed rapidly after a short induction period to be completed within a short time so that fully vulcanized rubber articles can be obtained in a simple vulcanization process under normal pressure without necessitating troublesome treatments such as post-vulcanization.

The acrylic rubber composition of this type, however, has a defect in respect of the poor surface lubricity and hence poor moldability as well as low slipperiness of the surface of vulcanized articles to have less usefulness. Therefore, it is eagerly desired to solve this problem for the acrylic rubber compositions of both of the unfoamable and foamable types.

SUMMARY OF THE INVENTION

The present invention accordingly has an object to provide an acrylic rubber composition, of which the acrylic rubbery polymer has vinyl group-containing organosilicon groups, compounded with an organic peroxide as a vulcanizing agent capable of giving vulcanized rubber articles having improved surface slipperiness. The invention also has an object to provide a cellular or spongy rubber article having improved surface properties.

Thus, the acrylic rubber composition of the invention comprises, as a blend:
(a) 100 parts by weight of an acrylic rubbery polymer having at least one vinyl group-containing organosilicon group in a molecule;
(b) from 10 to 200 parts by weight of a reinforcing filler having a specific surface area of at least 30 m²/g;
(c) from 5 to 100 parts by weight of a powder of which the particles have a substantially spherical configuration and an average particle diameter in the range from 0.1 to 50 μm; and
(d) from 0.1 to 10 parts by weight of an organic peroxide.

When a foamable acrylic rubber composition is desired, the above defined acrylic rubber composition comprising the components (a) to (d) further comprises:
(e) from 1 to 20 parts by weight of a blowing agent.

The above defined acrylic rubber composition of the present invention can readily be vulcanized by heating to give a vulcanized rubber article which may be solid, i.e. non-cellular, when the composition is unfoamable, or spongy or cellular when the composition is foamable.

DETAILED DESCRIPTION OF THE PREFERRED EMBODIMENTS

As is understood from the above given description, the most characteristic feature of the inventive acrylic rubber composition, which may be unfoamable or foamable, consists in the unique formulation including the acrylic rubbery polymer having at least one vinyl group-containing organosilicon group in a molecule as the component (a) and the specific powder of which the particles have a substantially spherical configuration and a specified average particle diameter as the component (c) in combination with a reinforcing filler as the component (b). As a consequence of this unique formulation, the inventive acrylic rubber composition is imparted with lubricity to greatly improve the moldability and also is capable of giving a vulcanized rubber article having excellent slipperiness or lubricity of the surface without decreasing the excellent properties such as high heat resistance and low permanent compression set inherent in acrylic rubber compositions in general or vulcanized articles thereof.

The acrylic rubbery polymer having in a molecule, at least one vinyl group-containing organosilicon group is an acrylic copolymer obtained by the copolymerization of an acrylic acid ester or methacrylic acid ester represented by the general formula $$CH_2=CR^1-CO-OR^2 \quad (I)$$

in which $R^1$ is a hydrogen atom or a methyl group and $R^2$ is an alkyl group or an alkoxy-substituted alkyl group, and an ethylenically unsaturated compound having a vinyl group-containing organosilicon group and copolymerizable with the above mentioned (meth)acrylic acid ester.

The group denoted by $R^2$ in the above given general formula (I) representing the (meth)acrylic acid ester is exemplified by methyl, ethyl, propyl, n-butyl, isobutyl, pentyl, hexyl, octyl, 2-ethylhexyl, 2-methoxyethyl and 2-ethoxyethyl groups.

Further, the ethylenically unsaturated compound having a vinyl group-containing organosilicon group copolymerizable with the (meth)acrylic acid ester is exemplified by the compounds expressed by the following structural formulas:

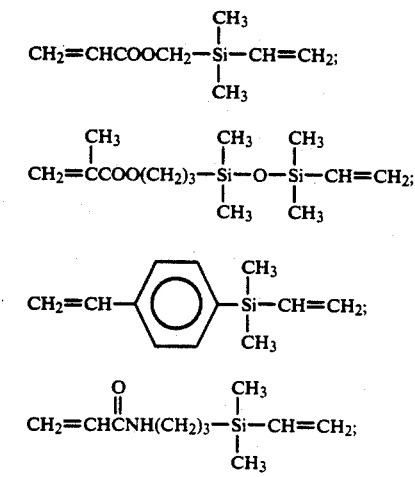

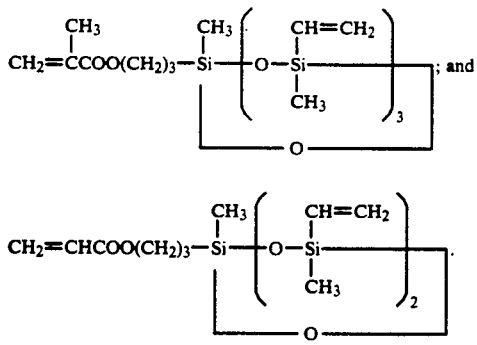

It is important in the ethylenically unsaturated monomeric compound having a vinyl group-containing organosilicon group that the vinyl group is directly bonded to the silicon atom and the molecule has another ethylenically unsaturated group not directly bonded to the silicon atom. When these organosilicon group-containing ethylenically unsaturated compounds are copolymerized with the (meth)acrylic acid ester, the vinyl group bonded to the silicon atom does not pertain to the copolymerization reaction and remains intact in the copolymer. The vinyl groups contained in the copolymer serve as the crosslinking points when the copolymer is compounded with an organic peroxide as a vulcanizing agent and the composition is heated in the process of vulcanization.

The acrylic rubbery copolymers of the above described type are disclosed, for example, in U.S. Pat. No. 4,722,975, Japanese Patent Publication 2-1859 and Japanese Patent Kokai 2-208328.

The amount of the ethylenicaly unsaturated monomeric compound having a vinyl-containing organosilicon group in the copolymerization with the (meth)acrylic acid ester of the general formula (I) is in the range from 0.01 to 10% by weight or, preferably, from 0.3 to 5% by weight based on the amount of the latter monomer. When the amount of the former monomer is too small, the number of the crosslinking points in the copolymer is consequently too small to give a vulcanized rubber article having high mechanical strengths. When the amount thereof is too large, on the other hand, the number of the crosslinking points in the copolymer would be too large so that the vulcanized rubber article obtained from the copolymer would have decreased rubbery elasticity not to be suitable for practical use.

The component (b) in the inventive rubber composition is a reinforcing filler. The type of this reinforcing filler is not particularly limitative provided that the specific surface area thereof is at least 30 m²/g as determined by the BET method. Examples of suitable reinforcing fillers include carbon black, fumed silica fillers prepared by the dry process available under the tradenames of Aerosil, Cab-O-Sil and the like, precipitated silica fillers prepared by the wet process from an alkyl silicate or sodium silicate, magnesium silicate, calcium silicate and the like as well as hydrophobic silica fillers obtained by the treatment of the above named silica fillers with an organosilicon compound such as alkoxy silanes, hexamethyl disilazane and the like or a higher fatty acid.

The amount of the reinforcing filler compounded in the rubber composition is in the range from 10 to 200 parts by weight or, preferably, from 20 to 100 parts by weight per 100 parts by weight of the acrylic rubbery copolymer as the component (a). When the amount of the reinforcing filler is too small, the rubber composition cannot give a vulcanized rubber article having high mechanical strengths due to insufficient reinforcing effect. On the other hand, an excessively large amount of the reinforcing filler can hardly be compounded with the acrylic rubbery copolymer not to give a uniform rubber composition or, if it could ever be obtained, the moldability of the rubber composition is so poor as not to be suitable for practical use.

The component (c) in the inventive acrylic rubber composition is a powder of which the particles have a substantially spherical configuration and serves to improve the moldability or, in particular, extrusion-moldability of the rubber composition and also to impart surface lubricity or slipperiness to the vulcanized rubber articles prepared from the rubber composition. The spherical particles of the powder should have an average particle diameter in the range from 0.1 to 50 μm or, preferably, from 0.2 to 10 μm. When the average particle diameter of the particles is too small, the desired effect for the improvement in the surface lubricity of the vulcanized rubber articles cannot be fully exhibited even by setting aside the problem due to the difficulty in the preparation of a powder having such an extremely small particle diameter. When the average particle diameter of the spherical particles is too large, on the other hand, the mechanical properties of the vulcanized rubber articles obtained from the rubber composition would be adversely affected.

The material of the powder as the component (c) is not particularly limitative provided that the particles thereof have a substantially spherical configuration and an average particle diameter mentioned above. Examples of the materials of the powder include thermoplastic resins such as fluorocarbon resins, polyester resins, polyamide resins, polypropylene and the like. Preferable materials from the standpoint of excellent surface lubricity imparted to the vulcanized rubber articles, however, are the poly(methyl silsesquioxane) obtained by the hydrolysis-condensation reaction of a methyl trialkoxy silane, an orthoalkyl silicate or a partial hydrolysis product thereof in an aqueous solution containing a hydroxide of an alkaline earth element or alkali carbonate or in an aqueous solution containing an amine compound or ammonia and polymers containing at least 10% by moles of the monomeric units in the form of blocks of linear organopolysiloxane units or polymer compositions thereof. Powders of the above described type are disclosed, for example, in Japanese Patent Publication 56-39808, Japanese Patent Kokai 55-5787 and Japanese Patent Kokai 62-257939 and are available as a commercial product.

The amount of the powder as the component (c) in the inventive acrylic rubber composition should be in the range from 5 to 100 parts by weight per 100 parts by weight of the acrylic rubbery copolymer as the component (a). When the amount of the powder is too small, the desired effect as mentioned above cannot be fully exhibited as a matter of course. When the amount thereof is too large, on the other hand, the rubber composition would have poor workability in roll milling due to stiffness and the rubbery elasticity of the vulcanized rubber article of the composition is decreased.

The component (d) in the inventive rubber composition is an organic peroxide which serves as a vulcanizing agent. Examples of suitable organic peroxides include o-chlorobenzoyl peroxide, p-chlorobenzoyl peroxide, dichlorobenzoyl peroxide, benzoyl peroxide, dicumyl peroxide, 2,5-diemthyl-2,5-di(tert-butylperoxy) hexane, di-tert-butyl peroxide, tert-butyl perbenzoate, 1,1-di(tert-butylperoxy-3,3,5-trimethyl cyclohexane, 1,3-bis(tert-butylperoxy isopropyl) benzene, tert-butylperoxy isopropyl carbonate and the like though not particularly limitative thereto. These organic peroxides can be used either singly or as a combination of two kinds or more according to need.

The amount of the organic peroxide compounded in the inventive rubber composition is in the range from 0.1 to 10 parts by weight per 100 parts by weight of the acrylic rubbery copolymer as the component (a) depending on the desired velocity of vulcanization. When the amount of the organic peroxide is too small, the rubber composition cannot be fully vulcanized as a matter of course. When the amount thereof is too large, on the other hand, the vulcanized rubber article prepared from the rubber composition would be somewhat rigid and brittle not to exhibit the desired rubbery elasticity.

The rubber composition of the invention consisting of the above described components (a) to (d) can be readily obtained by uniformly blending and kneading together each a specified amount of the respective components by using a conventional rubber processing machine such as Banbury mixers, kneaders, intermixers, two-roller mills and the like.

It is optional according to need that the rubber composition of the invention prepared by compounding the components (a) to (d) is further admixed with various kinds of known additives exemplified by non-reinforcing fillers including inorganic fillers such as metal oxides, e.g., titanium dioxide, aluminum oxide, zinc oxide and iron oxide, graphite powder, mica flakes, clay, talc, quartz powder, diatomaceous earth, baryta and aluminum hydroxide and organic fillers, antioxidants, aging retarders, flame retardants, coloring agents, mold-release agents, ultraviolet absorbers, dispersing aids, higher fatty acids, e.g., stearic acid and lauric acid, as a lubricant and so on.

The rubber composition of the invention has good moldability so that various kinds of shaped and vulcanized rubber articles can be obtained therefrom by a conventional rubber molding method undertaken for ordinary synthetic rubber compositions such as compression molding, injection molding, extrusion molding and calendaring. Since the principal ingredient thereof is the acrylic rubbery copolymer having an organosilicon group containing a vinyl group to serve as the crosslinking point in the vulcanization with an organic peroxide, the vulcanized rubber article is excellent in respect of the high heat resistance, weatherability and oil resistance as well as low permanent compression set. The vulcanized rubber articles have good mechanical strengths as a result of the formulation with the reinforcing filler. Further, the powder of spherical particles as the component (c) compounded in the rubber composition serves to impart surface lubricity to the vulcanized rubber articles. Accordingly, the rubber composition of the invention is quite satisfactory as a material for the manufacture of various kinds of automobile parts such as plug caps, ignition cords, weather strips, gaskets, hoses, O-rings and the like as well as various parts in industrial structures in general.

When a cellular or spongy rubber article is desired, the above described rubber composition of the invention can be rendered foamable by compounding with a blowing agent which is a compound capable of evolving a gas by decomposition when the rubber composition compounded therewith is heated for vulcanization. Various kinds of known blowing agents conventionally used in foamable rubber compositions can be used here without particular limitations. Examples of suitable blowing agents include inorganic blowing agents such as sodium hydrogencarbonate and ammonium hydrogencarbonate, and organic blowing agents such as nitroso compounds, e.g., N,N'-dinitroso pentamethylene tetramine, N,N'-dimethyl-N,N'-dinitroso terephthalamide and the like, azo compounds, e.g., azodicarbonamide, azobisisobutyronitrile and the like, benzene sulfonyl hydrazide, p,p'-oxy bis(benzene sulfonyl hydrazide), toluene sulfonyl hydrazide, p-toluene sulfonyl semicarbazide, trihydrazinotriazine, zinc-amine complex compounds and the like, of which azodicarbonamide and p,p'-oxy bis(benzene sulfonyl hydrazide) are preferred in respect of the good workability, safety and touch feeling of the spongy rubber articles obtained therewith. These compounds are also approved by Food and Drug Administration, U.S.A.

The amount of the blowing agent as the component (e) in the foamable acrylic rubber composition of the invention naturally depends on the desired degree of foaming but it is usually in the range from 1 to 20 parts by weight or, in most cases, from 3 to 10 parts by weight per 100 parts by weight of the acrylic rubbery copolymer as the component (a). When the amount of the blowing agent is too small, the vulcanized rubber article cannot have a cellular spongy structure as a matter of course. When the amount thereof is too large, on the other hand, the vulcanized and foamed rubber article would have a too coarse cellular structure and is readily collapsible not to be suitable for practical use. It is optional that the blowing agent is used in combination with a known blowing aid such as carboxylic acids, e.g., salicylic acid, and urea.

The procedure for the preparation of a spongy vulcanized rubber article from the foamable rubber composition of the invention can be conventional. For example, the foamable rubber composition is first compression-molded in a metal mold at a temperature of 120° to 200° C. for 30 seconds to 30 minutes and then subjected to expansion curing in an oven at a temperature of 150° to 200° C. for several minutes to give a cellular, spongy vulcanized rubber article having excellent touch feeling and good mechanical properties. The spongy vulcanized rubber article obtained in this manner can be used in various applications, for example, as automobile parts such as weather strips, sponge gaskets, protector sponge hoses and the like. The spongy vulcanized rubber article having a very fine cellular structure is capable of giving excellent feeling of touch so that the spongy rubber articles can be used as a material of puffs for the application of cosmetics such as liquid foundations and creamy foundations or as a material of eye shadow tips.

In the following, the acrylic rubber composition of the present invention is illustrated in more detail by way of examples, in which the term of "parts" always refers to "parts by weight".

EXAMPLE 1 AND COMPARATIVE EXAMPLE 1

In Example 1, a base compound was prepared by uniformly blending and kneading, in a pressurizable kneader, 100 parts of an acrylic copolymeric rubber having vinyl group-containing organosilicon groups (RV-2540, a product by Nissin Chemical Industry Co.) with 1 part of stearic acid, 2 parts of an antioxidant (Nauguard 445, a product by Uniroyal Co.), 40 parts of a HAF carbon black and 30 parts of a poly(methyl silsesquioxane) powder consisting of spherical particles having an average particle diameter of 2 μm (X-52-590A, a product by Shin-Etsu Chemical Co.). Then, a 100 parts portion of this base compound was admixed with 0.9 part a vulcanizing agent containing 65% of 1,1-di(tert-butylperoxy)-3,3,5-trimethyl cyclohexane (C-13, a product by Shin-Etsu Chemical Co.) and 1.8 parts of a vulcanization accelerator (Sumifine BM, a product by Sumitomo Chemical Co.) and uniformly blended on a two-roller mill to give a vulcanizable rubber composition.

This rubber composition was subjected to the test of extrusion-moldability by using a 20-mm extruder machine of which the L/D ratio was 15, diameter of the die was 5 mm, barrel temperature was 70° C., head temperature was 110° C. and velocity of revolution was 50 rpm to give results that the velocity of extrusion was 130 cm/minute, die-swelling ratio was 38% and the appearance of the surface of the extruded body was excellently smooth. Separately, the rubber composition was subjected to compression vulcanization at 155° C. for 10 minutes followed by a post-vulcanization treatment in an oven at 180° C. for 4 hours to give a vulcanized test sheet of 2 mm thickness and a test piece of 12.6 mm thickness for the test of the permanent compression set. These test specimens were subjected to the measurement of mechanical properties either as prepared or after an aging treatment at 175° C. for 72 hours. Besides, the test sheet was subjected to the measurement of the surface lubricity by using a surface-property testing machine (HEIDEN-14 manufactured by Shin-Toyo Kagaku Co.) under the conditions of line contacting and a load of 500 g. The results obtained in these tests are shown in Table 1 below. The values of the permanent compression set shown in Table 1 were obtained after keeping the test specimen under compression at 150° C. for 72 hours.

In Comparative Example 1, for comparison, the same experiment as above was undertaken excepting omission of the poly(methyl silsequioxane) powder in the formulation of the rubber composition. The results of the extrusion-moldability test were that: the extrusion velocity was 105 cm/minute; die swelling ratio was 62%; and appearance of the extruded body was good. The results obtained in the tests for the mechanical properties of the vulcanized test specimens are shown also in Table 1.

EXAMPLE 2

A base compound was prepared by uniformly blending and kneading, by using a pressurizable kneader, 100 parts of the same acrylic rubber copolymer RV-2540 as used in Example 1 with 2 parts of stearic acid, 1 part of an antioxidant (Irganox #1010, a product by Ciba Geigy Co.), 40 parts of a fumed silica filler after hydrophobic treatment (Aerosil R-972, a product by Nippon Aerosil Co.), 10 parts of active zinc oxide and 3 parts of a poly(ethylene glycol) (#400, a product by Nippon Oil and Fat Co.). A 100 parts portion of this base compound was further admixed with 6.4 parts of spheric particles of a cured polymeric powder containing linear organopolysiloxane blocks, of which the average particle diameter was 5 μm (X-52-594, a product by Shin-Etsu Chemical Co.), 4.8 parts of azodicarbonamide as a blowing agent and 1.2 parts of dicumyl peroxide as a vulcanizing agent and uniformly kneaded on a two-roller mill to give a foamable rubber composition.

TABLE 1

| | Example 1 | Comparative Example 1 |
|---|---|---|
| As vulcanized | | |
| Hardness, JIS A | 50 | 53 |
| Ultimate elongation, % | 310 | 330 |
| Tensile strength, kgf/cm$^2$ | 101 | 115 |
| Permanent compression set, % | 17 | 19 |
| Surface lubricity, g | 600 | 950 |
| Increment after aging | | |
| Hardness, point | +2 | +5 |
| Ultimate elongation, % | −3 | −4 |
| Tensile strength, % | −5 | −11 |

A 100 mm by 100 mm by 6 mm metal mold for compression molding was filled with this foamable rubber composition which was press-cured therein by heating at 150° C. for 10 minutes under a pressure of 20 kgf/cm$^2$ followed by expansion curing in an oven at 180° C. for 10 minutes to give a foamed and vulcanized rubber body having a spongy structure. This spongy rubber body had a bulk density of 0.22 g/cm$^3$ and was capable of giving very pleasant feeling of touch and good slipperiness on human skin so that the sponge rubber was found to be suitable as a material of cosmetic puffs and eye shadow tips.

EXAMPLES 3 AND 4 AND COMPARATIVE EXAMPLE 2

The formulation of the foamable rubber composition and the experimental procedure were substantially the same as in Example 2 in each of these examples and comparative example except that the powder of spherical particles X-52-594 was compounded in an amount of 4 parts or 15 parts in Examples 3 and 4, respectively, and was entirely omitted in Comparative Example 2. The thus obtained spongy rubber bodies had a bulk density of 0.22, 0.20 and 0.25 g/cm$^3$, respectively. The feeling of touch of these sponge rubber bodies was found excellent in Examples 3 and 4 but fair in Comparative Example 2 and the slipperiness on human skin was found good, excellent and poor in Examples 3 and 4 and Comparative Example 2, respectively.

EXAMPLE 5

The formulation of the rubber composition and experimental procedure were substantially the same as in Example 2 excepting replacement of the powder of spherical particles X-52-594 with the same amount of the same powder of spherical particles as used in Example 1, i.e. X-52-590A. The thus obtained sponge rubber body had a bulk density of 0.24 g/cm$^3$ and the feeling of touch and slipperiness on human skin were as excellent as in Example 2.

EXAMPLE 6 AND COMPARATIVE EXAMPLE 3

The formulation of the rubber composition and experimental procedure in Example 6 were substantially the same as in Example 2 excepting replacement of the fumed silica filler with the same amount of a FEF carbon black. Further, the experiment of Comparative Example 3 was conducted in substantially the same manner as in Example 6 excepting omission of the powder of spherical particles X-52-594 in the formulation of the rubber composition. The sponge rubber bodies obtained were subjected to the measurement of the mechanical properties according to the procedure specified in JIS K 6301 to give the results shown in Table 2 below which also gives the bulk density and the results of the tests for the feeling of touch and slipperiness on human skin of the sponge rubber bodies. The sponge rubber body obtained in Example 6 was found to be suitable as a material of wether-strip sponge gaskets of automobiles.

TABLE 2

|  | Example 6 | Comparative Example 3 |
|---|---|---|
| Bulk density, g/cm$^3$ | 0.22 | 0.24 |
| Hardness, Ascar C | 8 | 10 |
| Tensile strength, kgf/cm2 | 13 | 15 |
| Ultimate elongation, % | 240 | 270 |
| Feeling of touch | excellent | fair |
| Slipperiness on human skin | excellent | poor |

What is claimed is:

1. An acrylic rubber composition which comprises, as a blend:
   (a) 100 parts by weight of an acrylic rubbery polymer having at least one vinyl group-containing organosilicon group in a molecule;
   (b) from 10 to 200 parts by weight of a reinforcing filler having a specific surface area of at least 30 m$^2$/g;
   (c) from 5 to 100 parts by weight of a powder of which the particles have a substantially spherical configuration and an average particle diameter in the range from 0.1 to 50 μm;
   (d) from 0.1 to 10 parts by weight of an organic peroxide; and
   (e) from 1 to 20 parts by weight of a blowing agent.

2. The acrylic rubber composition as claimed in claim 1 in which the blowing agent is azodicarbonamide or p,p'-oxy bix(benzene sulfonyl hydrazide).

* * * * *